US012763555B2

(12) United States Patent
Hollis et al.

(10) Patent No.: US 12,763,555 B2
(45) Date of Patent: Oct. 13, 2026

(54) HUBLESS SHEAVE

(71) Applicant: Sherman + Reilly, Inc., Chattanooga, TN (US)

(72) Inventors: Harby Carter Hollis, Cullman, AL (US); John Jeremiah Morton, Chattanooga, TN (US); Douglas Bruce MacDonald, Dawsonville, GA (US); Toni Corinne Tran, Chattanooga, TN (US)

(73) Assignee: Sherman + Reilly, Inc., Chattanooga, TN (US)

( * ) Notice: Subject to any disclaimer, the term of this patent is extended or adjusted under 35 U.S.C. 154(b) by 839 days.

(21) Appl. No.: 18/001,356

(22) PCT Filed: Jun. 25, 2021

(86) PCT No.: PCT/US2021/039114

§ 371 (c)(1),
(2) Date: Dec. 9, 2022

(87) PCT Pub. No.: WO2021/263118

PCT Pub. Date: Dec. 30, 2021

(65) Prior Publication Data

US 2023/0327412 A1 Oct. 12, 2023

Related U.S. Application Data

(60) Provisional application No. 63/043,881, filed on Jun. 25, 2020.

(51) Int. Cl.
*H02G 1/04* (2006.01)

(52) U.S. Cl.
CPC .................................... *H02G 1/04* (2013.01)

(58) Field of Classification Search
CPC .......... B65H 57/14; B65H 57/26; H02G 1/04; F16H 55/50
See application file for complete search history.

(56) References Cited

U.S. PATENT DOCUMENTS 3,010,700 A 11/1961 Petersen
4,301,994 A * 11/1981 Lindsey .................. H02G 1/04 254/405

(Continued)

OTHER PUBLICATIONS

European Examination Report dated Sep. 26, 2024 issued in European Application No. 21829658.0.

(Continued)

*Primary Examiner* — Seahee Hong
(74) *Attorney, Agent, or Firm* — TROUTMAN PEPPER LOCKE LLP; Ryan A. Schneider; Korbin M. Blunck

(57) ABSTRACT

A hubless sheave system for supporting ropes, wires, and other suspended loads is described. The system can include an inner bearing race and an outer bearing race. The inner bearing race can be affixed to one or more support arms via a mounting bracket. The support arms can be detachably coupled to a support (e.g., a power pole, building, or other structure) to support the system and the suspended load. The outer race can be rotatably coupled to the inner race on a bearing surface, enabling the outer race to rotate freely about the inner race. The outer race can include a sheave groove sized and shaped to support a wire or rope during installation. The system can be used to string and temporarily support power or communications lines during installation, or "stringing," and then removed when permanent supports are installed.

19 Claims, 7 Drawing Sheets

(56) References Cited

U.S. PATENT DOCUMENTS

| | | | | | |
|---|---|---|---|---|---|
| 4,989,398 | A | | 2/1991 | Kuhn et al. | |
| 5,156,378 | A | * | 10/1992 | Harken | F16H 55/50<br>254/416 |
| 6,224,080 | B1 | | 5/2001 | Ross | |
| 6,375,163 | B1 | | 4/2002 | Carlson et al. | |
| 9,960,575 | B2 | | 5/2018 | Dunn et al. | |
| 2008/0067482 | A1 | | 3/2008 | Carlson et al. | |
| 2010/0306962 | A1 | | 12/2010 | Breyer et al. | |
| 2014/0070154 | A1 | | 3/2014 | Win et al. | |

OTHER PUBLICATIONS

International Preliminary Report on Patentability in related PCT Application No. PCT/US21/39114 mailed Jan. 5, 2023.

International Search Report and Written Opinion in PCT Application No. PCT/US21/39114 mailed Sep. 24, 2021.

* cited by examiner

HUBLESS SHEAVE

CROSS-REFERENCE TO RELATED APPLICATIONS

This application is a § 371 national stage of International Application PCT/US2021/039114, with an international filing date of 25 Jun. 2021, which claims benefit under 35 USC § 119(e) of U.S. Provisional Patent Application No. 63/043,881 filed 25 Jun. 2020, the entirety of which is incorporated herein by reference as if set forth herein in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The disclosed technology relates generally to coated sheaves; and, more specifically, to coated sheaves that are manufactured by using an additive manufacturing process.

2. Description of Related Art

Sheaves are used to support wires, ropes, and other materials (collectively, "lines") during installation (e.g., installing new power lines on power poles) and to suspend lines from poles, buildings, and other structures. Sheaves generally include a wheel with a sheave groove sized and shaped to fit a particular line without creating pressure points. Sheaves are also generally designed to rotate to prevent chafing as lines are pulled, expand and contract due to changing conditions, etc.

A problem with existing sheaves, however, is that as lines are pulled through the sheave they are not generally pulled in perfect alignment with the sheave. As a result, the sheave tends to rotate around somewhat as the lines are pulled, for example, by a worker in a bucket truck. In addition, because sheaves are generally supported about a central axis of the wheel, the center of gravity of the sheave (approximately at the axle) and the center of the load from the line (at the top of the wheel) are fairly far apart. In other words, because most sheaves have a central axle, or are supported about the circumference of the inner race, the center of gravity (CG) of the system is generally very close to the center axis of the wheel. This means that as the sheave wobbles and twists during installation, the line moves around in an arc with a radius equal to the distance between the axel (or thereabouts) and the top of the wheel. As a result, for a large sheave, the line may be moving around in an arc of almost two feet in diameter.

This makes the line harder to control and can cause damage to surrounding structures, injure workers, and even damage the line. The conventional configuration also increases the distance between the load—the line sitting on the top of the wheel—and the CG of the system near the axis. For a sheave with a two-foot wheel, this creates a lever arm of almost a foot with potentially thousands of pounds being supported. This torque can bend the wheel, bend or break the mounting brackets, and damage the line, among other things.

SUMMARY

Examples of the present disclosure include a system comprising a line support wheel, a mounting bracket, and one or more mounting arms. The line support wheel can comprise an outer race including a groove, an inner, hubless race, and a bearing surface disposed between the inner race and the outer race. The bearing surface can enable the outer race to rotate freely about the inner race with a predetermined amount of friction. The mounting bracket can be detachably coupled to an upper portion of the inner race. The support arms can be disposed on one, or both, sides of the line support wheel to detachably couple the system to a structure.

The disclosed technology can include a hubless sheave system having a mounting bracket, a support arm detachably coupled to the mounting bracket and configured to attach the system to a support, and a line support wheel configured to support a line. The line support wheel can include an outer race having a groove along an outer circumferential surface of the outer race, a hubless inner race, and a bearing surface disposed between the inner race and the outer race to enable the outer race to rotate freely about the inner race. The hubless inner race can be detachably coupled to the mounting bracket at an upper portion of the hubless inner race.

A center of gravity of the hubless sheave system can be nearer an outer circumference of the line support wheel than a center of the line support wheel. The mounting bracket can be through-bolted, riveted, or otherwise attached to the hubless inner race. The mounting bracket and the support arm can be a single continuous material.

The mounting bracket can include an inner mounting bracket and an outer mounting bracket. The inner mounting bracket and the support arm can be a single continuous material.

The support arm can be a first support arm and a second support arm. The first support arm and the second support arm can be symmetrical about a centerline of the line support wheel.

The support arm can be arcuate such that a load applied to the line support wheel can be centered below a mounting point of the support arm. The support arm can include one or more accessory bosses. The one or more accessory bosses can be configured to receive and support a light attached to the one or more accessory bosses. The one or more accessory bosses can be configured to receive and support a handle attached to the one or more accessory bosses.

The support arm can include a side frame rotatably coupled to the support arm. The side frame can be configured to rotate between an open position and a closed position. In the open position, the side frame can be configured to permit the line to be placed on the line support wheel. In the closed position, the side frame can be configured to prevent the line from falling off the line support wheel. The side frame can be spring loaded to cause the side frame to move from the open position to the closed position. The side frame can further include a latching mechanism configured to secure the side frame in the closed position. The side frame can be removably attached to the support arm. The latching mechanism comprises one or more magnets, a latch, or other latching mechanism.

The system can further include a line guide attached to the mounting bracket. The line guide can be configured to guide a line toward the line support wheel. The line guide can include a protrusion extending outwardly from the mounting bracket. The line guide can be removably attached to the mounting bracket.

The hubless inner race can be a first inner race and a second inner race. The first inner race and the second inner race can be removably coupled to each other. The first inner race and the second inner race can be configured to secure the outer race at least partially between the first inner race and the second inner race such that the outer race can rotate freely around the first inner race and the second inner race but cannot slide off of the first inner race or the second inner race.

The hubless inner race can include a handle, a light, a weather sensor, a power meter, or other accessories.

The system can further include a retainer configured to align one or more bearings between the outer race and the hubless inner race. The retainer can be configured to align the one or more bearings circumferentially between the outer race and the hubless inner race.

The bearing surface can include a plurality of bearings disposed between the inner race and the outer race. The plurality of bearings can include a plurality of roller bearings, ball bearings, or other suitable bearings.

The groove can be configured to receive and support a line placed on the outer race. The groove can include a semi-circular cross-sectional shape, a v-shaped cross-sectional shape, a rectangular cross-sectional shape, or other suitable cross-sectional shape. The groove can include a coating. The coating can include a dielectric material configured to electrically insulate the system from the line. The coating can be configured to reduce friction at an interface between the outer race and the line. The coating can be configured to increase friction at an interface between the outer race and the line.

The disclosed technology can include a hubless sheave having a mounting bracket and a support arm detachably coupled to the mounting bracket and configured to attach the hubless sheave to a support. The support arm can include a side frame rotatably coupled to the support arm and configured to rotate between an open position and a closed position. The hubless sheave can include a line support wheel that can be configured to support a line. The line support wheel can include an outer race having a groove along an outer circumferential surface of the outer race. The groove can be configured to receive the line. The line support wheel can also include a hubless inner race detachably coupled to the mounting bracket at an upper portion of the hubless inner race such that a center of gravity of the line support wheel is nearer an outer circumference of the line support wheel than a center of the line support wheel. The line support wheel can also include a plurality of bearings disposed between the hubless inner race and the outer race to enable the outer race to rotate freely about the inner race. The line support wheel can also include a retainer configured to align the plurality of bearings between the outer race and the hubless inner race.

The mounting bracket and the support arm can be a single continuous material. The mounting bracket can include an inner mounting bracket and an outer mounting bracket. The inner mounting bracket and the support arm can be a single continuous material. The support arm can be a first support arm and a second support arm. The first support arm and the second support arm can be symmetrical about a centerline of the line support wheel. The support arm can be arcuate such that a load applied to the line support wheel is centered below a mounting point of the support arm. The support arm further can include one or more accessory bosses.

In the open position, the side frame can permit the line to be placed on the line support wheel. In the closed position, the side frame can prevent the line from falling off the line support wheel. The side frame can be spring loaded to cause the side frame to move from the open position to the closed position. The side frame can include a latching mechanism configured to secure the side frame in the closed position. The latching mechanism can include one or more magnets.

The hubless sheave can include a line guide attached to the mounting bracket. The line guide can be configured to guide a line toward the line support wheel. The line guide can be a protrusion extending outwardly from the mounting bracket.

The hubless inner race can be a first inner race and a second inner race. The first inner race and the second inner race can be removably coupled to each other. The first inner race and the second inner race can be configured to secure the outer race at least partially between the first inner race and the second inner race such that the outer race can rotate freely around the first inner race and the second inner race but cannot slide off of the first inner race or the second inner race.

The plurality of bearings can be a plurality of roller bearings, ball bearings, or other suitable bearings.

The groove can include a semi-circular cross-sectional shape, a v-shaped cross-sectional shape, a rectangular cross-sectional shape, or other suitable shape for the application.

The groove can include a coating. The coating can be a dielectric material configured to electrically insulate the hubless sheave from the line. The coating can be configured to either reduce or increase friction at an interface between the outer race and the line.

Additional features, functionalities, and applications of the disclosed technology are discussed herein in more detail.

DETAILED DESCRIPTION

Examples of the present disclosure can comprise a hubless sheave system for supporting wires, ropes, and the like (collectively, "lines"). The system can comprise an inner bearing race and an outer bearing race. The inner race and the outer race can be rotatably coupled with ball bearings, roller bearings, plain bearings, or another suitable bearing surface to enable the outer race to rotate freely about the inner race. The inner race, in turn, can be stationary and supported by one or more support arms at the top of the inner race. This configuration shortens the load path, increases stability, and reduces the magnitude of the motion of the line during installation.

For ease of explanation, the system is discussed below with reference to stringing and supporting power and communications lines. One of skill in the art will recognize, however, that the system is not so limited. Indeed, the system could be used in any number of industries where ropes, support cables (e.g., for ski lifts), communications cables, wires, and other similar products need to be efficiently installed and supported. Thus, the description below is intended to be illustrative and not limiting.

As mentioned above, a problem with current sheave design is that the outer race of the sheave is generally supported such that the center of gravity (CG) of the system (i.e., the sheave plus the line) is very close to the centerline of the wheel. The line, on the other hand, is supported at the top of the wheel. As a result, when the sheave rotates during line installation, for example, the line tends to rotate and twist about the CG through an arc defined by the distance between the CG and the top of the wheel. For a two-foot sheave, for example, the line tends to move through a 12" radius and subtend an almost two-foot arc. This makes the line difficult to control, can damage the sheave or the pole, and poses some danger to any nearby workers.

In addition, the load path—from the top of the wheel to the middle of the wheel—is relatively long, which introduces twisting and moment forces into the system. This can reduce the life of the wheel, the bearings, the support arms, and the mounts, among other things. It would be useful to have a sheave system that reduces the distance between the CG and the load path through the use of improved geometry. This would reduce the arc through which the line moves during installation. This would also reduce the twisting forces placed on the sheave by the line during installation. It is to such a hubless sheave system that examples of the present disclosure are primarily directed.

Figure 1:
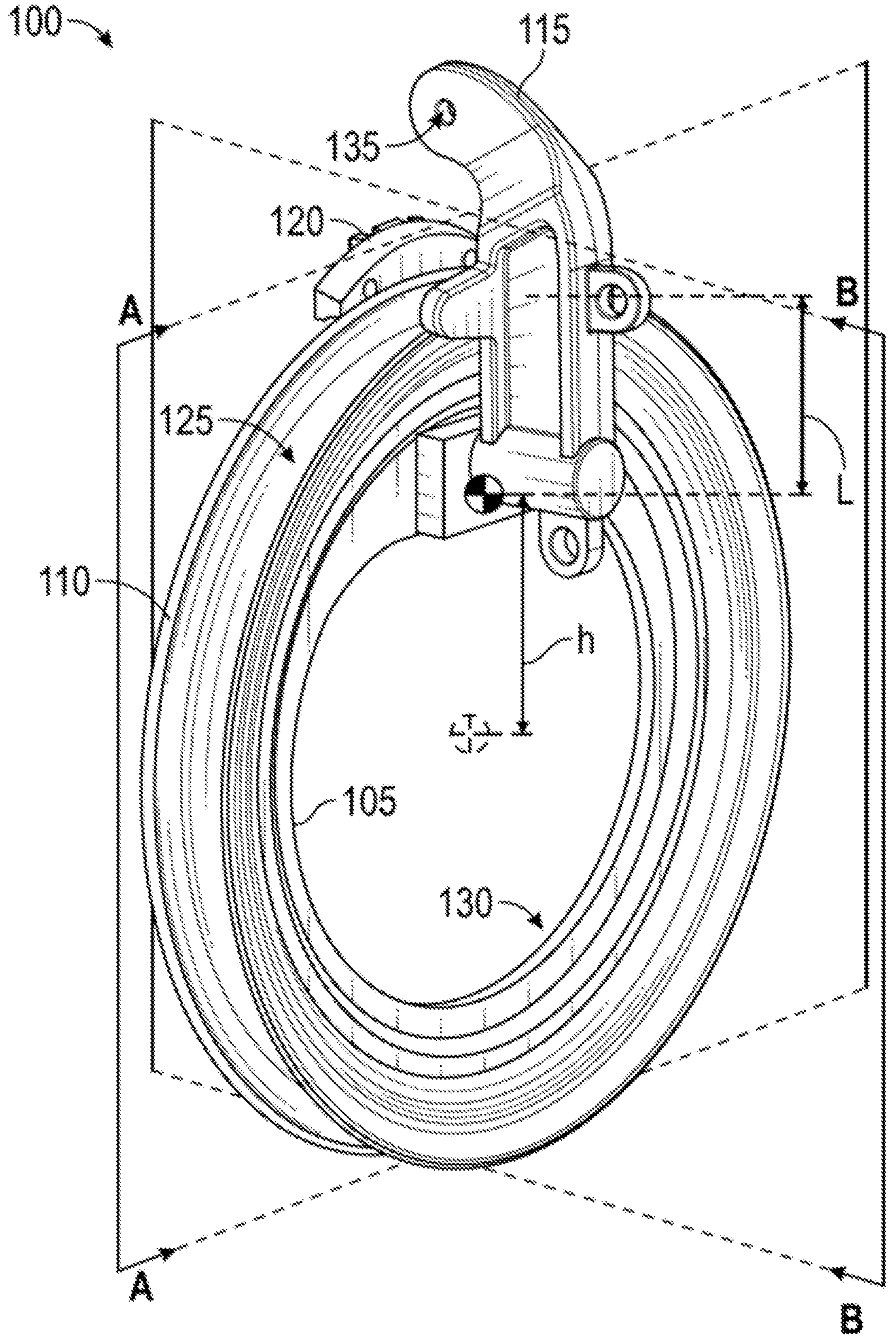
FIG. 1 is a front, perspective view of an example of a hubless sheave system, in accordance with some examples of the present disclosure.
Figure 2:
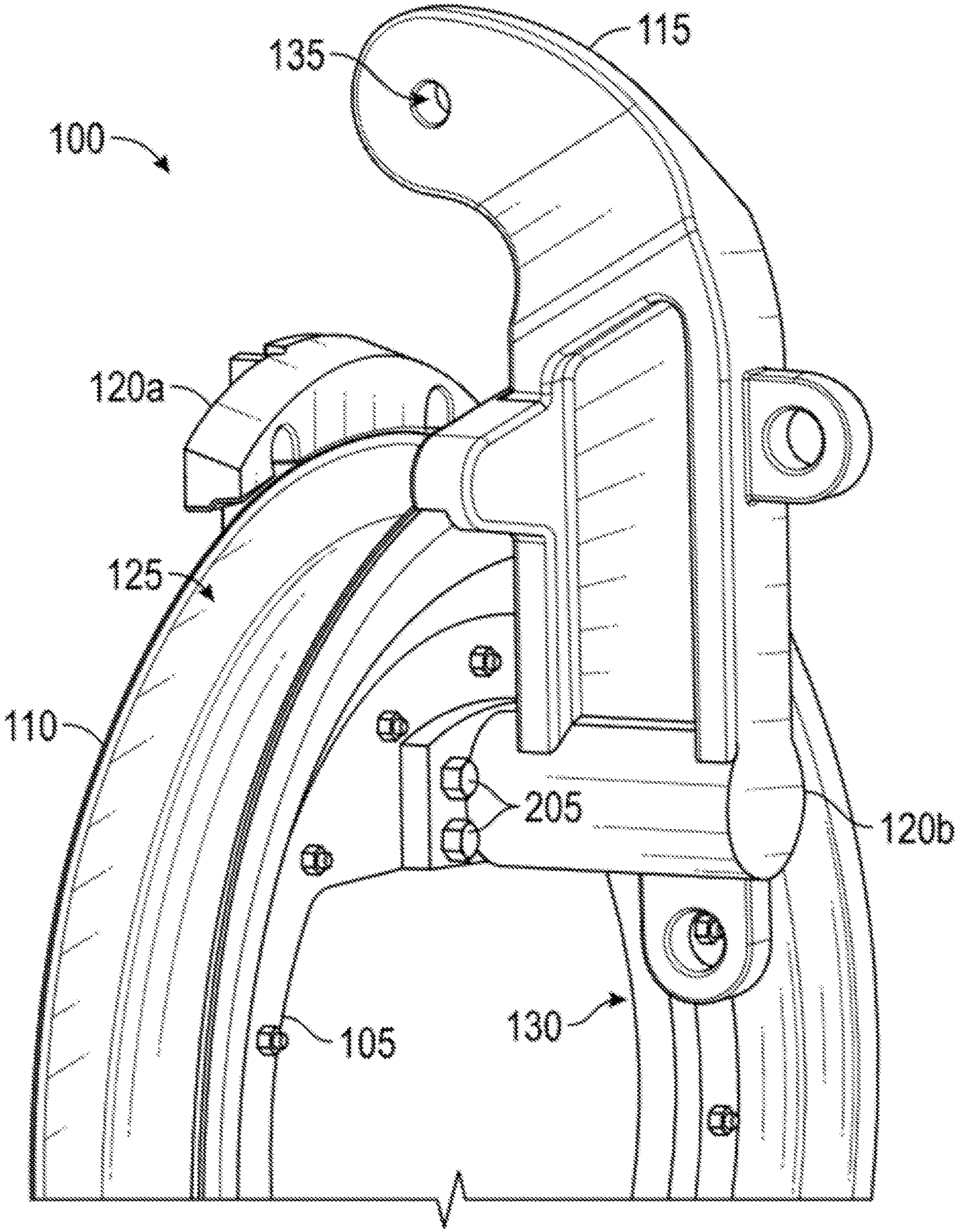
FIG. 2 is a detailed front, perspective view of an example of a hubless sheave system, in accordance with some examples of the present disclosure.

As shown in FIGS. 1 and 2, the hubless sheave system 100—also sometimes referred to as "blocks" 100—can comprise an inner race 105, an outer race 110, a support arm 115, and a mounting bracket 120. The outer race 110 can be mounted to the inner race 105 using a suitable bearing surface (discussed below, with reference to FIG. 3, element 315) such that the outer race 110 is retained on, but can freely rotate about, the inner race 105. In this manner, the outer race 110 can rotate to enable lines to be pulled through and over the system 100, while the inner race 105 remains stationary. For convenience, the inner race 105, outer race 110, and bearing surface can collectively be referred to as the line support wheel, or simply, the "wheel" 130 of the system 100.

In some examples, the outer race 110 can include a groove 125 sized and shaped to support the line while minimizing friction and not creating pinch points. So, for larger diameter lines, the groove 125 can include a larger diameter, and vice versa for smaller lines. The shape of the groove 125 can also vary based on the profile of the line—e.g., a triangular line can have a v-shaped inner surface, round lines can have a substantially semi-circular profile, and ribbon cables can have a flat or rectangular profile, as applicable.

In some examples, such as when used for supporting power distribution lines during stringing, the groove 125 may be made from, or coated with, a coating. The coating may have dielectric properties, for example, or may reduce friction between the line and the wheel. In some cases, the groove 125, or some portion thereof may also have grooves or other traction enhancing coating to reduce slippage between the line and the wheel 130.

As shown in FIG. 2, the mounting bracket 120 can be detachably coupled to the inner race 105. In some examples, the inner race 105 can sit between an inner mounting bracket 120*a* and an outer mounting bracket 120*b*, for example, and be mechanically "pinched" or through-bolted with suitable fasteners 205. In some examples, as shown, the mounting bracket 120 and the inner race 105 can have complementary holes and can be bolted, riveted, spot welded, or otherwise connected. In still other examples, the mounting bracket 120 and the inner race 105 can be integral—i.e., made of one piece of material. This can be achieved using casting, machining, or additive manufacturing, among other things.

Attaching the mounting bracket 120 to the inner race 105 at the top of the inner race 105 has the advantage of moving the CG of the system 100 up towards the load, decreasing the movement of the system during installation. This change in CG is depicted in FIG. 1 as height, h—i.e., the difference between the location of the CG in a conventional sheave (shown in dotted lines) and the location of the CG for the system 100. This configuration shortens the load path, (from l+h to just l); which, in turn, reduces the magnitude of the movement of the line as the line rotates and/or twists during installation. This configuration also reduces the moment arm of the load about the CG, which reduces the load on the system 100 including both side loading and twisting of the wheel 130, the mounting bracket 120, and the support arm(s) 115.

In some examples, the system 100 can include a second support arm (not shown) disposed opposite the support arm 115. The second support arm can be removeable from the system 100 to enable the line to be placed in the block. The second support arm can then be installed using suitable fasteners, clips, or other means to support the system 100 substantially symmetrically from both sides.

In some examples, the support arm 115 can be substantially arcuate, or curved, and one-sided. The arcuate shape can enable the downward load on the system 100 to be centered below the mounting point 135. The one-sided support arm 115, on the other hand, can enable the line to be installed from one side without disassembling the sheave. Unlike conventional sheaves, therefore, this configuration can enable an existing line to be supported in the middle without disassembling the system 100 or cutting the line. If, during installation, it is determined that additional support is needed in the middle of a line that has already been strung across multiple supports, for example, additional systems 100 and/or poles can be conveniently added in the middle of the line. This can also be helpful during repairs or maintenance to existing lines (e.g., to replace a worn or broken sheave).

The conductivity, materials, tolerances, and other parameters of the system 100 can be varied based on the application. If the system 100 is to be used to string power lines, for example, some, or all, of the components may have dielectric properties to insulate power lines from ground, for example, and prevent poles, and other equipment, from becoming energized. Some, or all, of the system 100 can also be powder coated, painted, anodized, galvanized or otherwise treated to reduce, or prevent, corrosion. Some, or all, of the components of the system 100 can also be coated with substances to reduce or increase the friction between the line and the wheel 130.

When using the system 100 for stringing power lines, for example, a plurality of blocks 100 can first be installed onto the power poles or towers and rigged into place. This can be accomplished using a helicopter (e.g., in difficult terrain), a bucket truck, or manually by climbing the poles. A pilot line (or, p-line) can then be fed into blocks 100, which can also be accomplished using the helicopter, the bucket truck, or manually by climbing the poles. The p-line can be a strong, but flexible, line (e.g., nylon or Kevlar® rope) that is more easily handled and fed through the blocks 100.

The pilot line can then be used to pull through a pulling line. The pulling line may be stronger, heavier, and or less flexible than the pilot line, but lighter and more flexible than the line (e.g., a large conductor). The pulling line can be installed with a truck, a power takeoff (PTO) winch on a truck, or specialized pilot line pulling equipment. Sometimes for smaller lines, the pilot line step and/or the pulling line step can be omitted.

The pulling line can then be attached to the conductor and used to pull the conductor through the blocks 100. The conductor can then be "sagged," or brought to tension with suitable pulling equipment (e.g., a "stringer") and then marked. A conductor hook can then be used with a ratchet winch to lift the sagged conductor out of each block 100 to enable the blocks 100 to be removed. The blocks 100 can then be removed and replaced with the permanent hangers (e.g., insulators/dampers). Finally, the conductor can then be "clipped in" to the permanent hanger and connected/electrified, as appropriate.

The tolerances in the system 100 can be varied to achieve various effects. The tolerances between the inner race 105, bearing surface, and outer race 110 can be tight, for example, to introduce a calculated amount of friction into the system 100. This can prevent lines from unspooling during installation, for example, and may facilitate proper tensioning of the lines. When the system 100 is used to string smaller lines, for example, the tolerances between the components 105, 110, 205 may be set to provide as little friction as possible. In this manner, as the line is installed, the line is not damaged from rubbing or chafing. This can prolong the life of insulating coatings, sheathes, and/or the lines themselves.

Figure 3:
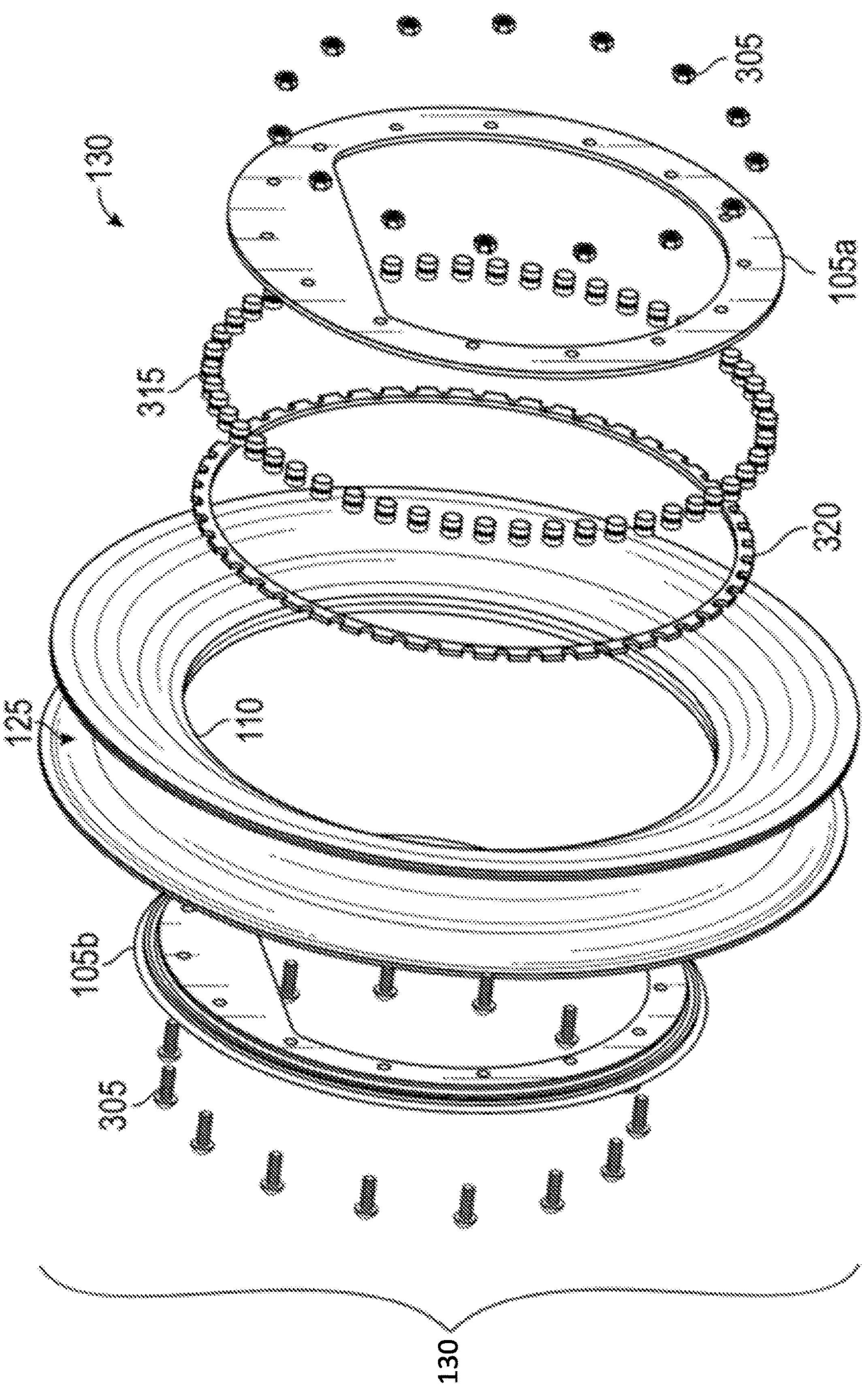
FIG. 3 is an exploded view of the hubless sheave system of FIG. 1, in accordance with some examples of the present disclosure.

As shown in FIG. 3, the wheel 130 can comprise the outer race 110, one or more inner races (e.g. a first inner race **105*a* and a second inner race 105*b*), a plurality of fasteners 305, 310 and a plurality of bearings 315. As shown, in some examples, the outer race 110 can be a single piece, or integral, while the inner races 105*a*, 105*b*** can be of split design to facilitate assembly. Of course, other configurations could be used and are contemplated herein.

The inner races **105*a*, 105*b*, outer race 110, and bearings 315 can be assembled using suitable fasteners such that the outer race 110 can rotate about the inner races 105*a*, 105*b*. The outer race 110 can ride on a suitable bearing surface such as, for example, roller bearings 315 (shown), ball bearings, or plain bearings. In some examples, the roller bearings 315 can be located using a suitable cage, or retainer 320. The retainer 320 can set the spacing of the roller bearings 315 and can be coupled to the inner race 105. In some examples, the fasteners 305, 310 can comprise a nut 310 and bolt 305 (shown) to enable the components 105, 110, 315 to be disassembled, cleaned, and repaired. In other examples, the system 100** can be substantially maintenance free and can be assembled with rivets, welding, adhesive, or other suitable means.

Figure 4:
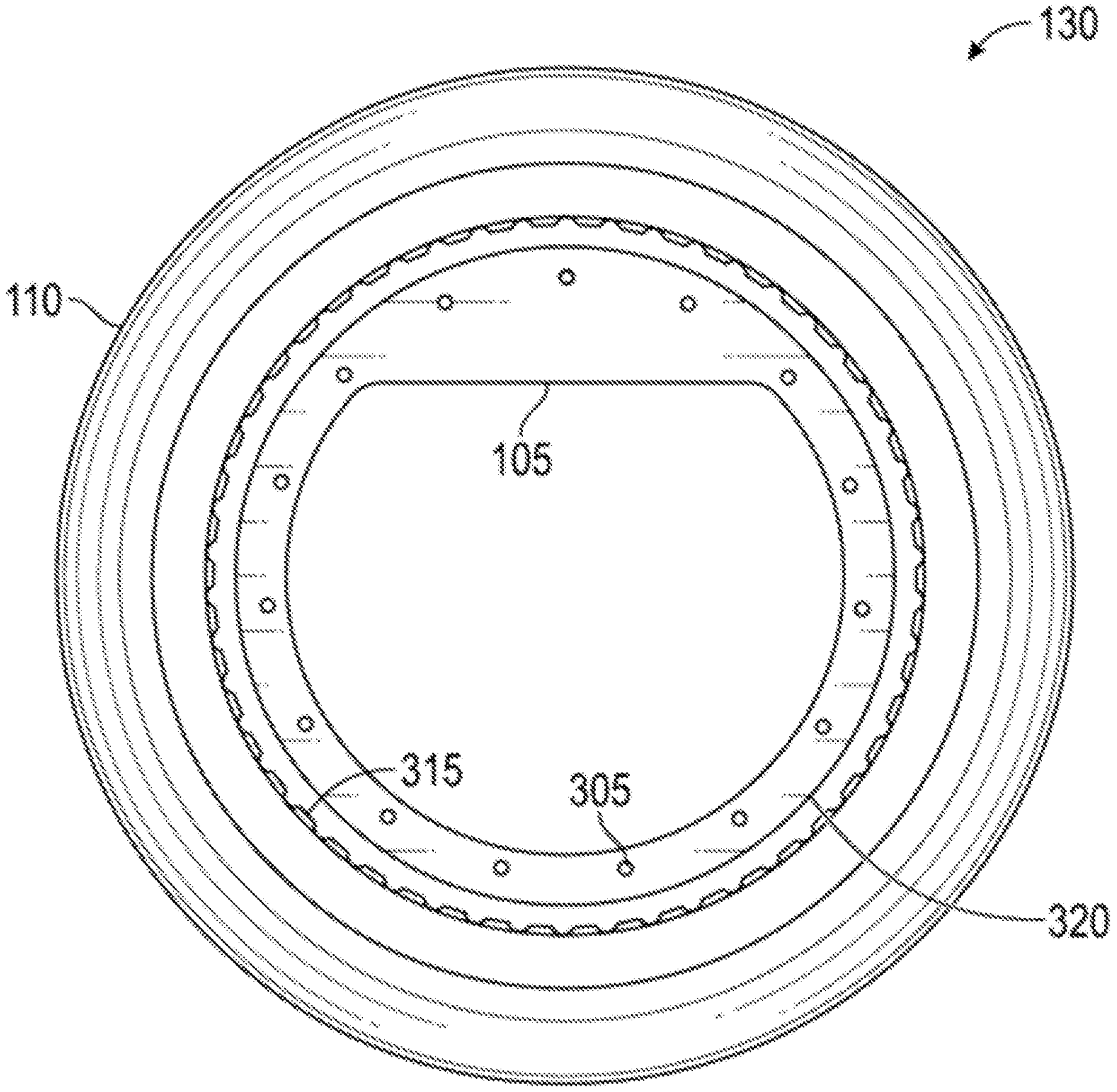
FIG. 4 is a cross-sectional view of the hubless sheave system of FIG. 1 taken across the center line (section plane A-A) of the sheave, in accordance with some examples of the present disclosure.

As shown in FIG. 4, the outer race 110 can be mechanically coupled to, and retained and supported by, the inner race 105 using roller bearings 315. As shown, roller bearings 315 can be distributed circumferentially between the inner race 105 and the outer race 110 to enable the outer race 110 to rotate about the inner race 105. Of course, the roller bearings 315 could instead be a plain bearing surface, or other surface, suitable to enable the outer race 110 to rotate freely about the inner race 105. The type of bearing surface and the tolerances between the components 105, 110, 315 can be varied to adjust the friction and play between the components 105, 110, 315 based on the application. Tighter tolerances may provide more precise motion, for example, but may also introduce friction into the system 100.

Figure 5:
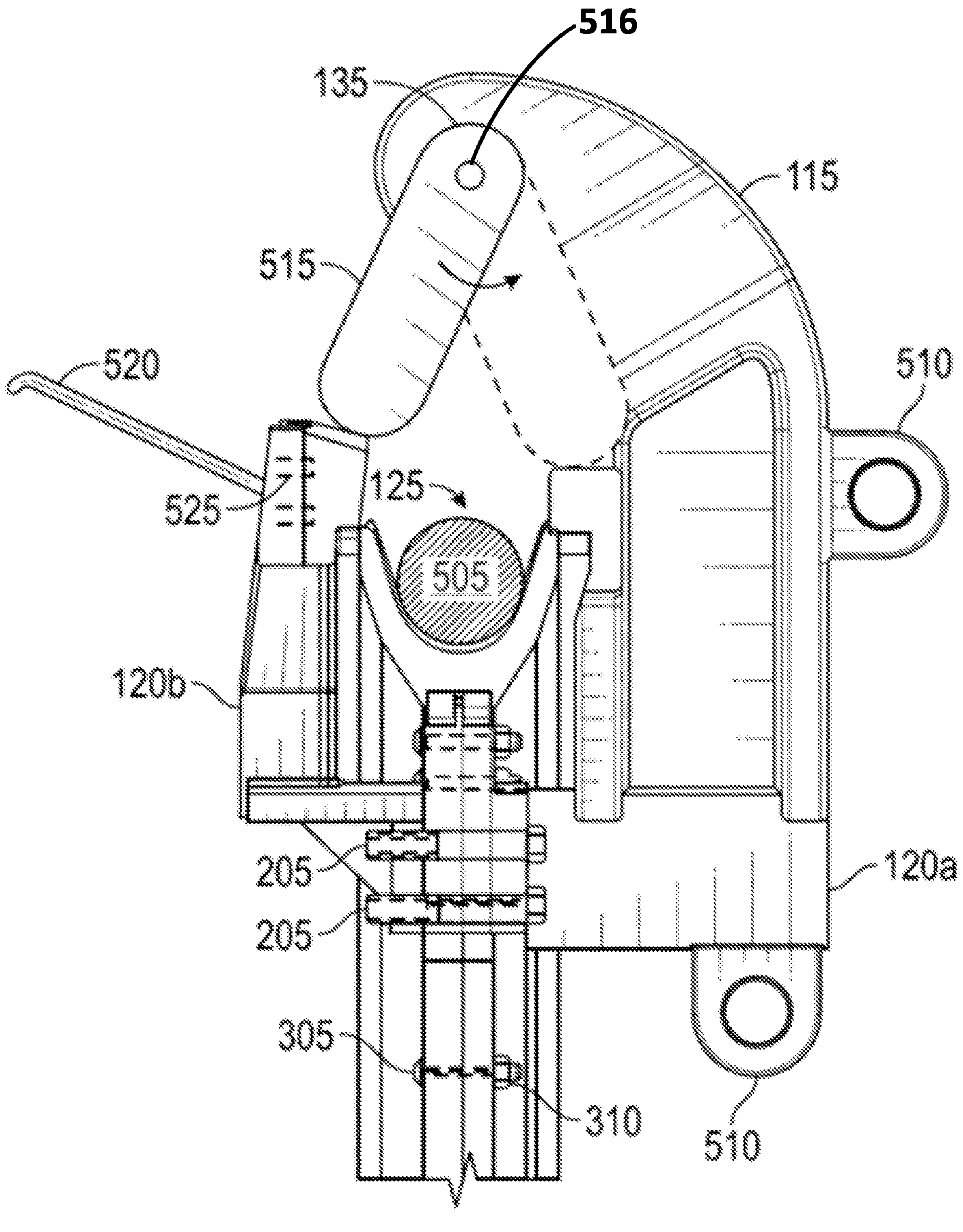
FIG. 5 is a cross-sectional view of the hubless sheave system of FIG. 1 taken through the support arm (section plane B-B), in accordance with some examples of the present disclosure.

FIG. 5 depicts a cross section of the support arm 115 and mounting bracket 120 through plane B-B. As mentioned above, the mounting bracket 120 can comprise an inner mounting bracket **120*a* and an outer mounting bracket 120*b* detachably coupled to the inner race 105 via one or more fasteners 205. In this manner, the inner race 105 is held stationary by the support arm 115 via the mounting bracket 120. The outer race 110, on the other hand, is free to turn about the inner race 105 by virtue of the roller bearings 315**.

FIG. 5 also depicts the groove 125 of the outer race 110 and an example conductor 505. As shown, in some examples, the groove 125 can be sized and shaped to have substantially the same cross-section as the conductor 505. The groove 125 can also include a material or coating to increase or decrease friction and/or conductivity between the conductor 505 and the outer race 110. When used for power line installation, for example, the groove 125 can include a coating that reduces the friction between the sheath of the conductor 505, for example, and may also provide electrical isolation.

In some examples, the mounting bracket 120 and/or the support arm can also include one or more accessory bosses 510. The accessory bosses 510 can enable additional components, such as lights or handles, to be installed on the system 100. This may be useful when installing lines at night, for example, or to enable the system 100 to be manipulated during installation.

In some examples, the system 100 can also include a retainer, or "side frame," 515 attached to the support arm 115 and/or the mounting bracket. The side frame 515 can essentially be a door to prevent the conductor 505 from coming out of the system 100. In some examples, the side frame 515 can be spring-loaded such that the conductor 505 can easily push the side frame 515 open. Once the conductor 505 is sufficiently inside the system 100 (e.g., in the groove 125), the side frame 515 can automatically close. This can enable the conductor 505 to be easily inserted from the side when necessary (i.e., as opposed to the end of the conductor 505 being "threaded" through the system 100). This can enable extra support to be added during installation, for example, and provides a means for removing the system 100 when installing permanent supports.

In some examples, the side frame 515 can have a latching mechanism (not shown). The latching mechanism can have a locked position and an unlocked position. In the unlocked position, the side frame 515 can open to enable the conductor 505 to be inserted into the system 100. In the locked position, the side frame 515 can be prevented from opening to further retain the conductor 505 inside the system 100. The latching mechanism can comprise an actual hook or latch that engages with the support arm 115, strong magnets between the support arm 115 and the side frame 515, or a locking mechanism on the pivot, or axle 516, of the side frame 515. The latching mechanism may be used instead of, or in addition to, any spring loading on the side frame 515.

In other examples, the side frame 515 can be removable to enable the conductor 505 to be installed in the system 100. In some examples, the axle 516 can be removable (e.g., a hitch pin), for example, to enable the side frame 515 to be removed. In other examples, the side frame 515 can be installed with fasteners at one, or both, ends to enable the side frame 515 to be removed for insertion of the conductor 505 and reinstalled for retention of the conductor 505.

In some examples, the side frame 515 can also include a line guide 520. The line guide 520 can be positioned on the mounting bracket 120 to help guide the conductor 505 into the correct location to open the side frame 515. The line guide 520 can be a protrusion that can extend outwardly from the mounting bracket 120 to help guide the conductor 505 toward the side frame 515 and ultimately toward the groove 125 of the line support wheel 130. The line guide 520 can be removably coupled to the mounting bracket 120, for example, by one or more fasteners 525. In other examples, the line guide 520 can be clipped, welded, riveted, press fit, or otherwise attached to the mounting bracket 120. The side frame 515 can be particularly useful when using helicopters to string lines, for example, as the helicopter can lower the line onto the guide 520 from above and then "slide" down the guide 520 with the conductor 505 until the conductor 505 falls into the groove 125. The side frame 515 can then snap shut retaining the conductor within the system 100.

Figure 6A:
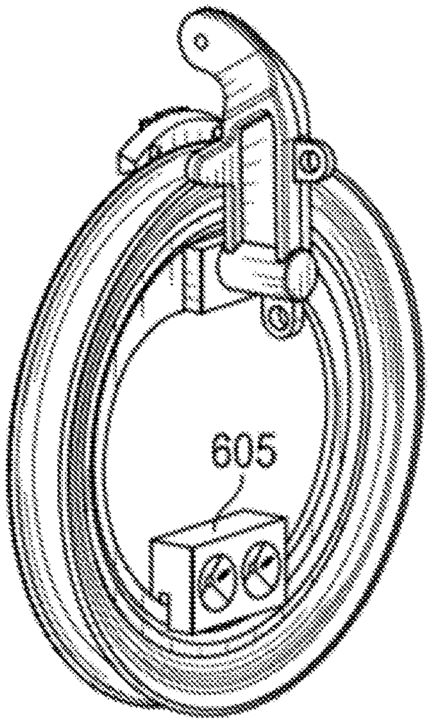
FIGS. 6A-6C depict various accessories that can be used in conjunction with the hubless sheave system, in accordance with some examples of the present disclosure.
Figure 6B:
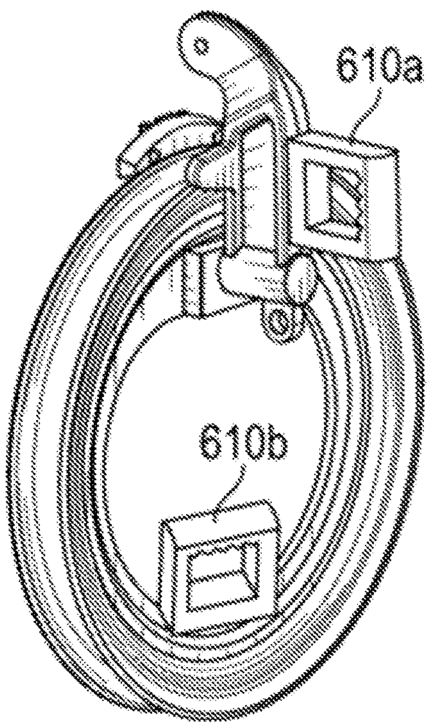
Figure 6C:
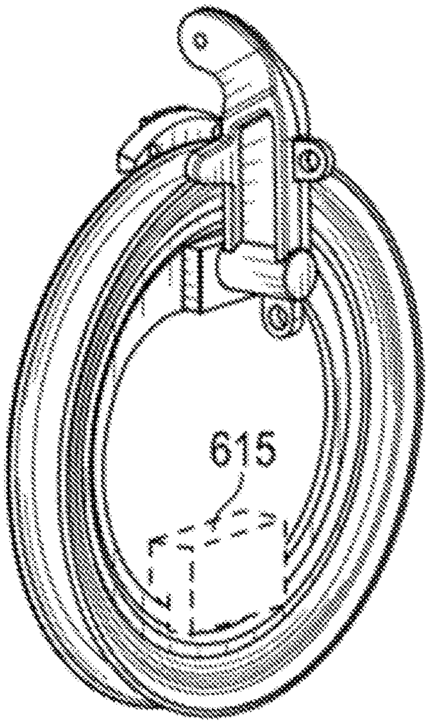

As shown in FIGS. 6A-6C, because the inner race 105, support arm 115, and mounting bracket 120 are substantially stationary with respect to any support (e.g., a power pole or building), these components 105, 115, 120 can be used to mount a variety of useful accessories. As shown in FIG. 6A, for example, a light 605—e.g., a work light, streetlight, strobe light, or other type of light—can be mounted on the inner race 105. This can enable a strobe near the top of the power pole for aircraft, for example, or a convenient work light for emergency repairs.

As shown in FIG. 6B, these components 105, 115, 120 can also be used to mount one or more handles 610. This can provide a convenient, safe, and comfortable handhold for use when installing the system, for example, or manipulating the line during installation, among other things. As shown, the handle 610 can be mounted on, or integrally cast, into the support arm 115 or the inner race 105. Of course, the handle 610 could also be mounted on the inner mounting bracket 120*a* or the outer mounting bracket 120*b*, which are also stationary.

As shown in FIG. 6C, these components 105, 115, 120 can also be used to mount various electronics 615 (depicted as a simple box). This can include, for example, weather sensors (e.g., wind speed sensor, humidity sensor, anemometer, pressure sensor, temperature sensor, rain gauge, etc.), power meters, or other electronics. In some examples, the system 100 can include a power meter (e.g., an inductive amp probe or a shunt), for example, to warn workers when a line accidentally becomes live during installation. The system 100 can also include other communication electronics such as, for example, internet routers, cellular microcells, utility intranet connections, or cable TV routers.

Figure 7:
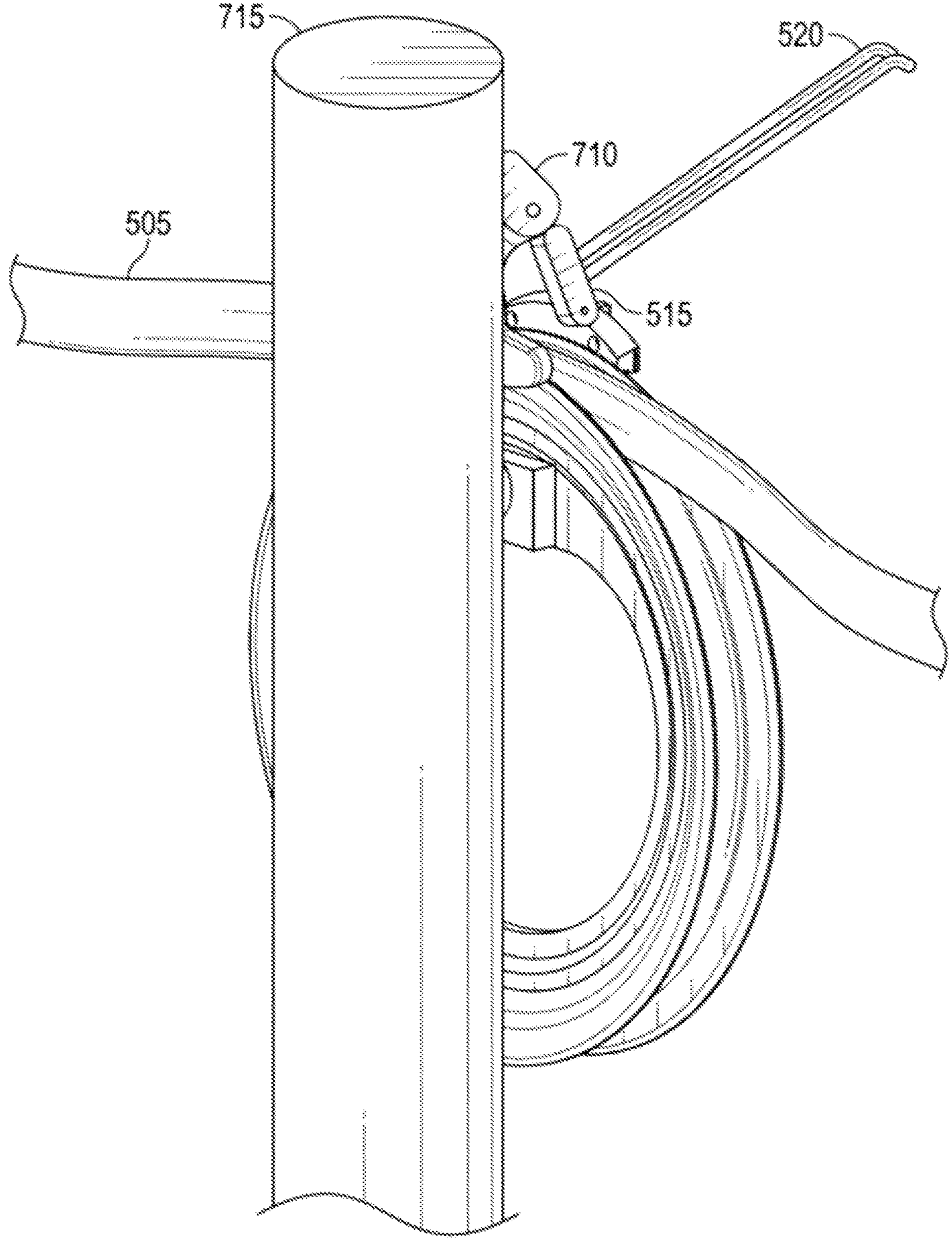
FIG. 7 depicts an example of the hubless sheave system supporting a line on a pole, in accordance with some examples of the present disclosure.

FIG. 7 depicts the system 100 mounted to a pole 715 (e.g., a power pole or telephone pole) and supporting the conductor 505. Of course, the system 100 can also be used to support communications lines, or other lines, during installation. The system 100 may be affixed to the pole 715 using a suitable bracket 710. The bracket 710 can be screwed into the pole 715, for example, and then the system 100 can be lifted into place using a handle 610*b*. The system 100 can then be fastened to the bracket 710 using a suitable fastener (e.g., a bolt or rivet) such that it hangs from the mounting bracket 120 and support arm 115.

The conductor 505 can then be pulled through, or lifted into, the groove 125 of the wheel 130, which is sized and shaped to "fit" the conductor 505. In other words, if the conductor 505 is round and has a 1" diameter, the profile of the groove 125 can be a semi-circle 1" in diameter plus any desired clearance. In this manner, the groove 125 closely conforms to the conductor 505, providing ample support and minimizing relative movement between the conductor 505 and the wheel 130 (and thus, chafing).

When the conductor 505 is lifted into the system 100 (e.g., by a bucket truck or helicopter), the conductor 505 can be placed on top of the guide 520, slid down until it contacts and opens the side frame 515, and then placed inside the system 100. Once in the groove 125, the conductor 505 is retained by the groove 125 and, if necessary, by the side frame 515 (e.g., if the system 100 is twisting around). The side frame 515 can provide additional retention for the conductor 505, but can be easily opened or removed to remove the system 100 and install permanent supports.

While several possible examples are disclosed above, examples of the present disclosure are not so limited. For instance, while the system is discussed above with reference to suspending power or communications lines, the system could also be used in many other industries such as transportation (e.g., towing, cables cars, street cars, and trains); rope for climbing, rigging, and boundaries; and virtually any other lines that need to be strung and/or suspended. In addition, while various features are disclosed, other designs could be used. The wheel 130 is shown with a groove 125 for round lines, for example, but could also be flat, v-shaped, or other suitable shapes depending on the lines being suspended.

Such changes are intended to be embraced within the scope of this disclosure. The presently disclosed examples, therefore, are considered in all respects to be illustrative and not restrictive. The scope of the disclosure is indicated by any claims filed in a subsequent non-provisional application, rather than the foregoing description, and all changes that come within the meaning and range of equivalents thereof are intended to be embraced therein.

We claim:

1. A hubless sheave system comprising:

a mounting bracket; and a line support wheel configured to support a line, the line support wheel comprising:

an outer race having a groove along an outer circumferential surface of the outer race;

a hubless inner race attached to the mounting bracket, the hubless inner race comprising:

a first inner race disposed on a first side of the outer race; and a second inner race disposed on a second side of the outer race, the second inner race being removably coupled to the first inner race;

a plurality of bearings disposed between the hubless inner race and the outer race; and a retainer disposed between the outer race and the hubless inner race and configured to align the plurality of bearings between the outer race and the hubless inner race in a spaced apart relationship.

2. The system of claim 1, wherein a center of gravity of the hubless sheave system is nearer an outer circumference of the line support wheel than a center of the line support wheel.

3. The system of claim 1 further comprising a support arm detachably coupled to the mounting bracket and configured to attach the system to a support.

4. The system of claim 3, wherein the support arm is arcuate such that a load applied to the line support wheel is centered below a mounting point of the support arm.

5. The system of claim 3, wherein the support arm further comprises one or more accessory bosses.

6. The system of claim 5, wherein the one or more accessory bosses are configured to receive and support at least one of a light or a handle.

7. The system of claim 3, wherein the support arm further comprises a side frame rotatably coupled to the support arm, the side frame being configured to rotate between an open position and a closed position, wherein, when in the open position, the side frame is configured to permit the line to be placed on the line support wheel, and wherein, when in the closed position, the side frame is configured to prevent the line from falling off the line support wheel.

8. The system of claim 7, wherein the side frame is spring loaded to cause the side frame to move from the open position to the closed position.

9. The system of claim 1 further comprising a line guide attached to the mounting bracket, the line guide being configured to guide the line toward the line support wheel.

10. The system of claim 1, wherein the first inner race and the second inner race are configured to secure the outer race at least partially between the first inner race and the second inner race such that the outer race can rotate freely around the first inner race and the second inner race but cannot slide off of the first inner race or the second inner race.

11. The system of claim 1 further comprising:

a support arm detachably coupled to the mounting bracket and configured to attach the system to a support; and a bearing surface disposed between the hubless inner race and the outer race to enable the outer race to rotate freely about the hubless inner race, wherein the hubless inner race is detachably coupled to the mounting bracket at an upper portion of the hubless inner race.

12. A hubless sheave comprising:

a mounting bracket;

a support arm detachably coupled to the mounting bracket and configured to attach the hubless sheave to a support; and a line support wheel configured to support a line, the line support wheel comprising:

an outer race having a groove along an outer circumferential surface of the outer race, the groove being configured to receive the line, the outer race defining a first bearing surface along an inner circumference of the outer race;

a hubless inner race coupled to the mounting bracket, the hubless inner race comprising:

a first inner race disposed on a first side of the outer race; and a second inner race disposed on a second side of the outer race, the second inner race being removably coupled to the first inner race to define a second bearing surface along an outer circumference of the hubless inner race; and a plurality of bearings disposed between the first bearing surface defined by the outer race and the second bearing surface defined by the hubless inner race, the plurality of bearings configured to enable the outer race to rotate freely about the hubless inner race.

13. The hubless sheave of claim 12 further comprising a side frame configured to transition between an open position and a closed position, wherein, when in the open position, the side frame is configured to permit the line to be placed on the line support wheel, and wherein, when in the closed position, the side frame is configured to prevent the line from falling off the line support wheel.

14. The hubless sheave of claim 13, wherein the side frame further comprises a latching mechanism configured to secure the side frame in the closed position.

15. The hubless sheave of claim 14, wherein the latching mechanism comprises one or more magnets.

16. The hubless sheave of claim 12, wherein the hubless inner race comprises a first inner race and a second inner race.

17. The hubless sheave of claim 16, wherein the first inner race and the second inner race are configured to secure the outer race at least partially between the first inner race and the second inner race such that the outer race can rotate freely around the first inner race and the second inner race but cannot slide off of the first inner race or the second inner race.

18. The hubless sheave of claim 12 wherein the support arm comprises a side frame rotatably coupled to the support arm and configured to rotate between an open position and a closed position, wherein the hubless inner race is detachably coupled to the mounting bracket at an upper portion of the hubless inner race such that a center of gravity of the line support wheel is nearer an outer circumference of the line support wheel than a center of the line support wheel, and wherein the line support wheel further comprises:

a retainer disposed between the outer race and the hubless inner race and configured to align the plurality of bearings between the outer race and the hubless inner race in a spaced apart relationship.

19. A hubless sheave system comprising:

a mounting bracket;

a line support wheel configured to support a line, the line support wheel comprising:

an outer race having a groove along an outer circumferential surface of the outer race, the outer race defining a first bearing surface along an inner circumference of the outer race; and a hubless inner race attached to the mounting bracket, the hubless inner race comprising:

a first inner race disposed on a first side of the outer race; and a second inner race disposed on a second side of the outer race, the second inner race being removably coupled to the first inner race to define a second bearing surface along an outer circumference of the hubless inner race; and a plurality of bearings disposed between the first bearing surface defined by the outer race and the second bearing surface defined by the hubless inner race.

* * * * *